United States Patent [19]
Sobota et al.

[11] 4,277,819
[45] Jul. 7, 1981

[54] BLACKOUT LIGHTING FOR VEHICLES

[75] Inventors: Valentine M. Sobota, Warren; Marshall Vinson, East Detroit, both of Mich.

[73] Assignee: The United States of America as represented by the Secretary of the Army, Washington, D.C.

[21] Appl. No.: 54,721

[22] Filed: Jul. 3, 1979

[51] Int. Cl.³ .................... B60Q 1/26
[52] U.S. Cl. .................... 362/80; 362/800
[58] Field of Search .................... 362/61, 80, 285, 800; 313/499

[56] References Cited

U.S. PATENT DOCUMENTS

| | | | |
|---|---|---|---|
| 3,703,670 | 11/1972 | Kunz | 313/499 X |
| 3,754,135 | 8/1973 | Hulbert, Jr. | 362/303 X |
| 3,821,590 | 6/1974 | Kosman et al. | 362/800 X |
| 3,833,799 | 9/1974 | Audet | 362/800 X |
| 3,854,438 | 12/1974 | Soto | 362/80 X |
| 4,148,094 | 4/1979 | Bennett | 362/255 X |
| 4,152,618 | 5/1979 | Abe et al. | 362/800 X |
| 4,152,624 | 5/1979 | Knaebel | 313/499 X |
| 4,170,036 | 10/1979 | Sussel | 362/800 X |

*Primary Examiner*—Peter A. Nelson
*Attorney, Agent, or Firm*—Peter A. Taucher; John E. Becker; Nathan Edelberg

[57] ABSTRACT

Four red light emitting diodes are embedded in a synthetic resin encapsulant. Two diodes in each of two pairs are connected in parallel and the two pairs are connected in series with a resistance, a blocking diode, and an on-off switch. A fifth diode which emits yellow light when energized is connected in series with a resistance, a blocking diode, and a brake-actuated switch.

6 Claims, 4 Drawing Figures

BLACKOUT LIGHTING FOR VEHICLES

BACKGROUND AND SUMMARY OF THE INVENTION

The element of surprise is a requirement for offensive warfare tactics. Because modern mobile warfare is highly mechanized, and security calls for movement under cover of darkness, means must be provided for the fast, orderly movement of troops, means which enable the troops of a unit to "see" each other while maintaining a very low profile toward the enemy so as to avoid surveillance by the enemy.

The requirement is blackout lighting for vehicles that can be seen by friendly troops whether dismounted or mounted, but which is not visible to observers on the ground beyond a given distance from the light source, and which cannot be observed from the air by observers above a given altitude or outside a cone of observation of a given angle and having its vertex at the light source.

As far as we know, World War II blackout lighting used incandescent lamps covered by shields or masks of varying patterns to provide the required observability limits and the required observable light patterns.

SUMMARY OF THE INVENTION

This invention utilizes one or more light emitting diodes in a variety of combinations to provide limited visibility while at the same time requiring much less power and generating far less heat than with incandescent sources of light. Such diodes are available in different sizes having different light intensities such that a diode's light intensity can be matched with the required visibility limitations to provide a light source having the desired characteristics of observability to friendly troops within the required ranges and being not observable beyond certain ranges to meet security requirements as regards surveillance by the enemy, from given ground or air distances and outside certain cones of observability.

OBJECTS

It is accordingly an object of the invention to provide a vehicle blackout lamp which can be seen by friendly troops within certain limiting ranges and will not be observable by enemy troops outside certain predetermined distances and three-dimensional patterns.

The invention described herein may be manufactured, used, and licensed by or for the Government for governmental purposes without payment to us of any royalty thereon.

IN THE DRAWINGS

DETAILED DESCRIPTION

Figure 1:
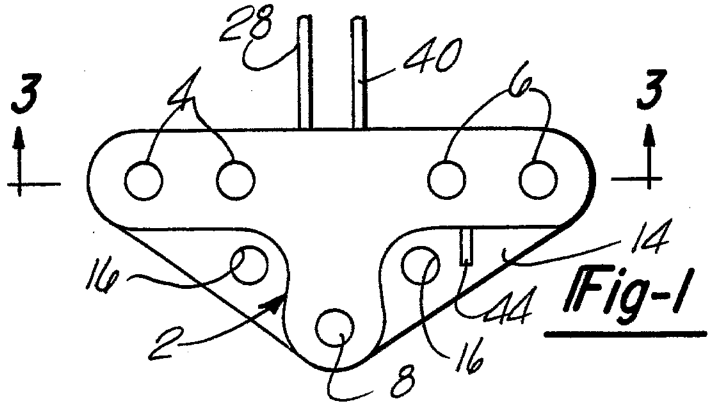
FIG. 1 is a view in elevation of one embodiment of the invention.
Figure 2:
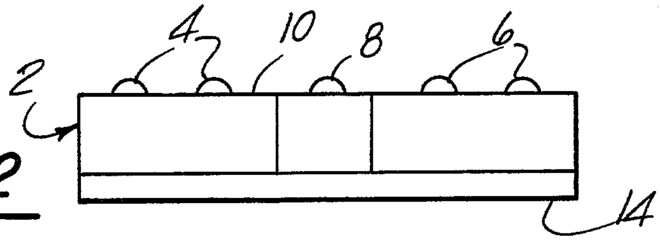
FIG. 2 is a bottom plan view of the embodiment shown in FIG. 1.
Figure 3:
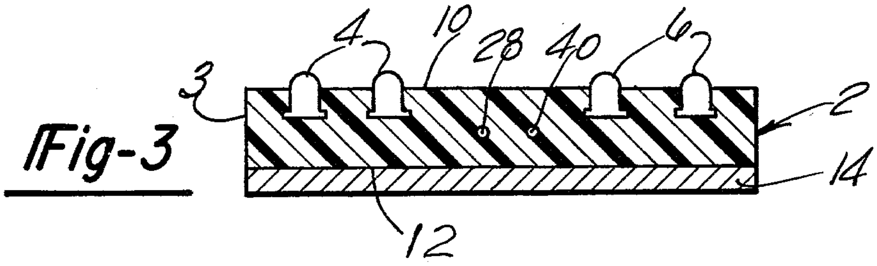
FIG. 3 is a view in section substantially along the plane of line 3—3.

FIGS. 1 and 2 show the external appearance of the illustrated embodiment of this invention, wherein a substantially T-shaped element 2 of any suitable nonconductive synthetic resin, as shown at 3 in FIG. 3, carries a first pair of light emitting diodes 4, 4 encapsulated by the synthetic resin with their tips protruding approximately as shown in FIGS. 2 and 3 so that, in their energized state, the light emitted by them is visible to an observer located within predetermined ranges.

Said diodes 4 are shown at the left end of the cross-bar of the T. In like manner, a second pair of diodes 6 is in the right end of the cross-bar of the T. Diodes 4 and 6 preferably emit a light that is primarily a long-wave radiant energy in the visible spectrum, i.e., red. They serve as marker lights, making it possible for an observer in an otherwise dark environment to see the vehicle on which the marker lights 4 and 6 are mounted.

At the lower end of the leg of the T, a fifth light emitting diode 8 is emplaced in the encapsulant resin. Diode 8 preferably emits a yellow light and is connected in an electric circuit which is normally open, but is closed by actuation of the brake pedal, as will be detailed below.

Diodes 4, 6 and 8 are all emplaced in encapsulant 3 so as to be visible by an observer looking at surface 10. To the opposing surface 12, a conductive grounding-mounting plate 14 is secured by any suitable closely adhering cement. Plate 14 is provided with openings 16 to receive conventional threaded fasteners (not shown) for securing the assembly to a vehicle body or frame.

Figure 4:
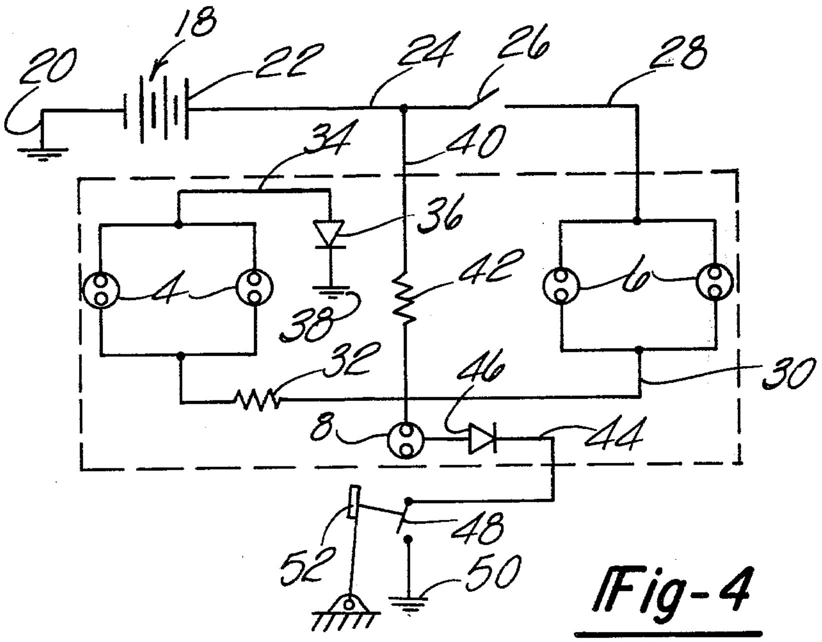
FIG. 4 is a circuit diagram of a vehicle blackout lighting system embodying the invention.

Circuitry for the light emitting diodes is shown in FIG. 4. The vehicle battery is shown at 18 and the negative terminal thereof is conventionally grounded as shown at 20.

The positive terminal 22 of battery 18 is connected by a conductor 24 with a switch 26. A conductor 28 connects switch 26 with the aforesaid second pair of diodes 6. As is evident from FIG. 4, diodes 6 are connected in parallel to conductor 28, and to a conductor 30, which in turn is connected through a resistance 32 with the aforesaid first pair of light emitting diodes 4. Diodes 4 are connected in parallel to conductor 30, and also to a conductor 34 which connects with a blocking diode 36, grounded at 38.

The brake light, or stop light, function is served by diode 8. A conductor 40 taps into conductor 24, preferably on the battery side of switch 26. If it is desired that the brake light circuit be activated only when the marker lights are on, then conductor 40 may be connected to conductor 28.

Conductor 40 connects with diode 8 through a resistance 42. Diode 8 is connected by a conductor 44 through a blocking diode 46 to one terminal of a switch 48; the remaining terminal of switch 48 is grounded as shown at 50. Switch 48 is normally open, as shown, and is connected to be closed by actuation of the vehicle brakes, and the drawing shows a brake pedal 52 connected to move switch 48 from its normally open position to closed upon actuation of brake pedal 52.

OPERATION

It will be understood by those skilled in the art that light emitting diodes are available commerically in a variety of sizes and of varying brilliance. Those characteristics will be taken into account by one who designs a circuit of the type here disclosed and claimed. Other characteristics to be considered are such things as: recommended operating voltage, which will determine what resistances should be used as shown at 32 and 42; light brilliance cones and distances in relation to observation and security requirements; color needs as determined by tactical and operational standards; and the like.

As disclosed herein, the light emitting diodes are arranged for energization by the vehicle battery, but a power source independent of the vehicle battery might be desired by the designer and could be used.

From the foregoing detailed description of circuitry and structure, the following summary of the operation will suffice. With switch 26 in the closed-circuit or "on" position, a circuit is completed as follows: battery 18, conductor 24, switch 26, conductor 28, diodes 6 in parallel, conductor 30 including resistance 32, diodes 4 in parallel, conductor 34, blocking diode 36, and back to battery 18 via grounds 38 and 20. Reversal of an electric current which might damage the diodes 4 and 6 is inhibited by diode 36.

When brake pedal 52 is actuated, normally open switch 48 is closed, completing a circuit as follows: battery 18, conductors 24 and 40 including resistance 42, diode 8, blocking diode 46, conductor 44, switch 48, and back to the battery via grounds 50 and 20. Reverse current flow through diode 8 is inhibited by blocking diode 46.

We wish it to be understood that we do not desire to be limited to the exact details of construction shown and described for obvious modifications will occur to a person skilled in the art.

We claim:

1. Blackout lighting for vehicles operating in wartime conditions, comprising:

(a.) a first pair of light emitting diodes connected in parallel, (b.) a second pair of light emitting diodes connected in parallel, (c.) a blocking diode, (d.) a blackout marker operator-operable switch mounted accessible to the vehicle operator, having a first terminal connected with the vehicle battery and a second terminal, the switch being operable between a closed-circuit position and an open-circuit position, (e.) a first resistance, (f.) a series electrical circuit comprising the first and second pairs of light emitting diodes, the blocking diode, and the first resistance, to a ground, (g.) means connecting the second terminal of said blackout marker switch with the aforesaid series circuit.

2. Blackout lighting as in claim 1, and:

(a.) a fifth light emitting diode, (b.) a second resistance, (c.) a second blocking diode, (d.) a second switch comprising an operator-operable switch connected to be closed when the vehicle brakes are energized, (e.) means to complete a circuit from the vehicle battery to a ground and including said second switch, the second blocking diode, the second resistance, and the fifth light emitting diode.

3. Blackout lighting as in claim 2, wherein all five light emitting diodes, both blocking diodes, and both resistances are encapsulated.

4. Blackout lighting as in claim 3, and an electrically conductive mounting plate secured to the encapsulant.

5. A brake lighting circuit for vehicles operating in wartime conditions, comprising:

(a.) a light emitting diode, (b.) a resistance, (c.) a blocking diode, (d.) an operator-operable switch connected to be closed when the vehicle brakes are energized, and (e.) means to complete a circuit from the vehicle battery to a ground and including said switch, the blocking diode, the resistance, and the light emitting diode.

6. A brake lighting circuit as in claim 5, wherein the blocking diode, the light emitting diode, and the resistance are encapsulated.

* * * * *